United States Patent
LePage

(10) Patent No.: US 6,645,554 B1
(45) Date of Patent: Nov. 11, 2003

(54) METHOD OF USING A MULTI-PURPOSE FLEXIBLE COATING COMPOUND

(76) Inventor: Joseph R. LePage, 1402 River Oaks Ct., Oldsmar, FL (US) 34677

( * ) Notice: Subject to any disclaimer, the term of this patent is extended or adjusted under 35 U.S.C. 154(b) by 0 days.

(21) Appl. No.: 10/064,608

(22) Filed: Jul. 30, 2002

(51) Int. Cl.[7] .................................................. B05D 1/28

(52) U.S. Cl. ........................ 427/154; 427/259; 427/260; 427/282; 427/421; 427/429

(58) Field of Search .................................. 427/154–156, 427/259, 260, 282, 287, 428, 429, 421

(56) References Cited

U.S. PATENT DOCUMENTS 5,866,199 A * 2/1999 Swidler et al.
6,211,282 B1 * 4/2001 Yamashita et al.

OTHER PUBLICATIONS

Internet website www.Farwestpaint.com/Catalog, Aug. 24, 2000 version.*

* cited by examiner

*Primary Examiner*—Fred J. Parker
(74) *Attorney, Agent, or Firm*—Ronald E. Smith; Smith & Hopen, P.A.

(57) ABSTRACT

A method for protecting surface finishes, sealing cracks, joints, and seams, and enhancing the aesthetic value of a surface includes the step of applying a multi-purpose flexible coating compound to the surface. The compound also has utility in the field of decorative writing, artistic creations, and creative doodling. The method further includes the steps of repeatedly stripping the compound from a surface and repeatedly re-applying the compound to the surface. The compound is a one to one mixture by volume of a brush caulking compound and a dimensional fabric paint. The amount of each ingredient in the compound may vary by twenty per cent so that the brush caulk may range from thirty to seventy per cent of the mixture as may the dimensional fabric paint.

12 Claims, 1 Drawing Sheet

FIG. 1
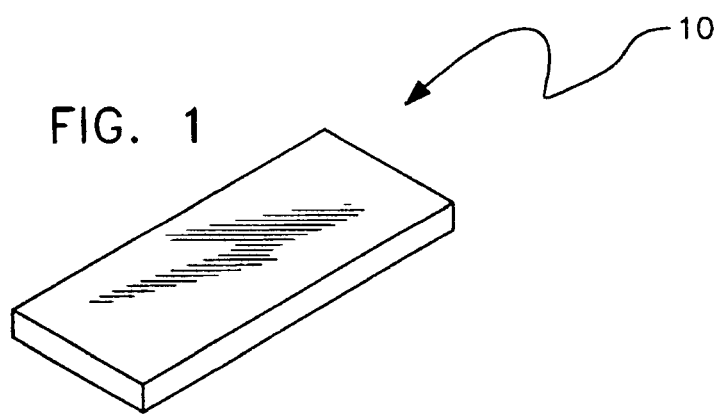
FIG. 2   FIG. 2A
         FIG. 2B
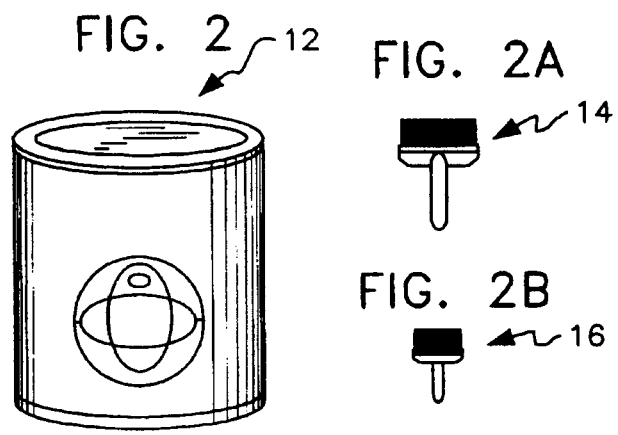
FIG. 3   FIG. 3A   FIG. 4
         FIG. 3B
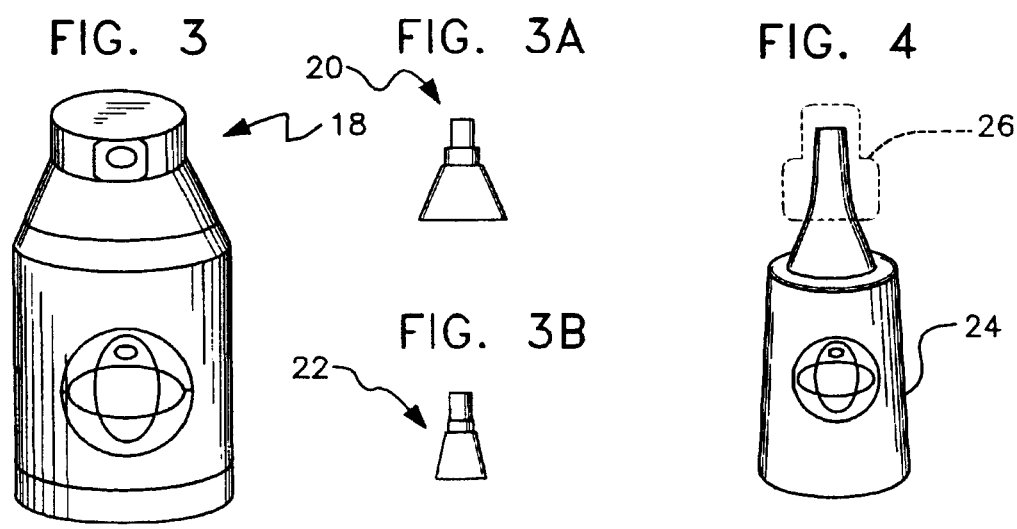

METHOD OF USING A MULTI-PURPOSE FLEXIBLE COATING COMPOUND

BACKGROUND OF INVENTION

1. Field of the Invention

This invention relates, generally, to methods for protecting, sealing, and decorating surfaces with a chemical compound that may be peeled off from the surface and re-used. More particularly, it relates to a method for using a chemical compound that protects surface finishes, seals cracks, joints, and seams, and that can be used in decorative writing, artistic creations,. or creative doodling.

2. Description of the Prior Art

U.S. Pat. No. 6,124,044 to Swidler discloses polymeric peel-off coating compositions and methods of use for such coating. The coating is an emulsion consisting of a vinyl-acrylic copolymer emulsion or a vinyl acetate-ethylene emulsion, or a combination of the two formed by admixing the emulsions with one another. The composition protects surfaces of automobiles and other products against abrasion, abrasive dust, water, acid rain, and the like. The emulsion is dried to form a water-resistant protective coating that may be removed from the underlying surface by peeling.

The Swidler method fills a need but there remains room in the art for improvement. For example, lower cost, easier application, faster drying times, easier removeability, and enhanced durability would characterize an improved product.

More particularly, the needed composition would provide an inexpensive surface protectant, sealant, and decorative utility means that could be applied easily, that would dry to the touch quickly, that could be easily removed, and that could be re-used many times.

The needed composition would also be free of solvents and would not require any release agents.

However, in view of the prior art considered as a whole at the time the present invention was made, it was not obvious to those of ordinary skill in the pertinent art how an improved composition could be provided.

SUMMARY OF INVENTION

The long-standing but heretofore unfulfilled need for an improved method for protecting surface is now met by a new, useful, and nonobvious invention. The novel method of protecting, sealing, and decorating a surface includes the steps of preparing a compound by admixing together a brush caulking compound and a dimensional fabric paint and applying the compound to a surface with a brush, roller, squeeze bottle, dispenser can, cartridge, texture finish sprayer, or other suitable applicator.

The step of preparing the compound includes the step of admixing together an elastomeric terpolymer brush caulking compound and a dimensional fabric paint. Alternatively, the step of preparing the compound includes the step of admixing together an acrylic copolymer brush caulking compound and a dimensional fabric paint.

The compound may be removed from the surface after the compound has cured. The removal is accomplished by manually stripping or peeling the compound from the surface. Advantageously, the compound has a tensile strength sufficient to ensure that it is stripped from the surface as an integral whole.

The compound is sufficiently durable to enable it to be repeatedly reapplied in its cured, integral whole state to a surface and repeatedly removed from the surface. The compound has sufficient adhesiveness to enable it to be adhered to the surface even after repeated strippings and reapplications to the surface. However, repeatability variations should be expected for various substrate surfaces.

More particularly, the novel compound may be stripped from a glass surface and reapplied to a painted metal surface. It may be stripped from the painted metal surface and reapplied to a plastic surface, a ceramic surface, and so on. The number of strippings and reapplications is not without limit, however.

The novel composition of matter consists essentially of a brush caulk admixed with a dimensional fabric paint in equal amounts by volume. The brush caulk is preferably of the elastomeric terpolymer type or the acrylic copolymer type. The brush caulk is also of the super adhesive type. Most brush caulk may be purchased as textured or smooth brush caulk. Smooth brush caulk is preferred over textured brush caulk in this invention, although textured brush caulk is not excluded from the scope of this invention.

A one to one (1:1) brush caulk to dimensional fabric paint admixture is preferred, but the amounts of each ingredient may vary by as much as twenty per cent (20%). Accordingly, the novel composition of matter may consist essentially of a brush caulk admixed with a dimensional fabric paint in amounts by volume where the brush caulk provides at least thirty percent of the composition of matter and the dimensional fabric paint provides no more than seventy percent of the composition of matter. In other words, the novel composition of matter may consist essentially of a brush caulk admixed with a dimensional fabric paint in amounts by volume where the brush caulk provides no more than seventy percent of the composition of matter and the dimensional fabric paint provides at least thirty percent of the composition of matter.

An important object of this invention is to provide a method for protecting, sealing, and decorating surfaces.

A closely related object is to attain the foregoing object with a compound that is inexpensive to manufacture, easy to apply, fast-drying, easy to remove and highly durable so that it may be removed and re-used many times.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which:

FIG. 1 is a perspective view of a rectangular piece of the novel material;

FIG. 2 is perspective view of a container for the novel material;

FIG. 2A is a top plan view of a brush suitable for use when applying the novel material to a wide area;

FIG. 2B is a top plan view of a brush suitable for use when applying the novel material to a spot area;

FIG. 3 is a perspective view of a dispenser can having utility as a container for the novel material;

FIG. 3A is a side elevational view of a nozzle suitable for use when applying the novel material to a wide area;

FIG. 3B is a side elevational view of a nozzle suitable for use when applying the novel material to a spot area; and FIG. 4 is a front elevational view of a squeeze bottle.

DETAILED DESCRIPTION

Referring to FIG. 1, it will there be seen that the reference numeral 10 denotes an illustrative embodiment of the present invention as a whole. In the example of FIG. 1, the novel material has a thickness of about one-sixteenth of an inch. The thickness may be varied as desired but the depicted thickness provides an effective surface protectant, sealant, or decorative coat for most materials.

The cure time for a piece of the novel material having a thickness of one eighth inch (⅛") is about forty eight (48) hours. For a one-sixteenth inch (1/16") thickness, the cure time is about twenty four (24) hours. However, it should be understood that a cure time is the time required for the novel compound to completely cure, ie., to dry all the way through. The time for the surface of the novel material to dry to the touch is about four hours for all thicknesses. These cure times assume an ambient temperature of about seventy five to eighty degrees Fahrenheit (75–80° F.) at atmospheric pressure.

When thicknesses of one-eighth inch (⅛") or greater are required, a process of layer building or the addition of a foaming agent to the novel compound is the method of preference. However, it should be understood that cure times for the novel compound for thicknesses greater than one-eighth inch (⅛") have a broad range of variability. Mixing ratios, coating thickness, temperature and humidity conditions and the like at the time of application are the dominant factors that affect cure times. Moreover, drying time may be reduced using heat from hot air dryers, baking ovens, heat lamps, or any other source of heat.

As indicated in FIG. 2, the novel compound may be stored in a container 12 that looks much like a typical can of paint. As depicted in FIG. 2A, the novel compound may be applied to a wide area by a wide brush 14 and as depicted in FIG. 2B, the novel compound may be applied to a spot area by a narrow brush 16. Brushes having bristles as depicted or having sponge foam-applicators, not shown, may be used.

As indicated in FIG. 3, a dispenser can 18, somewhat like a shaving cream dispenser, may be advantageously employed as an applicator for the novel material. A wide nozzle, denoted 20 in FIG. 3A, may be employed in wide areas and a narrow nozzle 22, depicted in FIG. 3B, may be advantageously employed in spot areas.

A squeeze bottle 24, depicted in FIG. 4 and having a cap 26 drawn in phantom lines, also serves as a suitable dispenser.

The novel compound may also be applied by a roller, a cartridge (such as used when applying caulking compound, for example), by texture finish sprayer (such as used in applying a textured coating to walls and ceilings, for example), or by any other suitable technique. The novel material has insufficient viscosity to be sprayed from a pump spray nozzle.

It should be understood that the novel compound may be applied as a protective covering, sealant, or decoration to any painted or unpainted metallic surface. It applies equally well to painted stucco, ceramic, FORMICA®, glass, painted wood, plastic, fiberglass, or other substantially impervious substrate.

It may be applied one time only to paper, rubber, STYROFOAM®, unpainted wood, fabric, and other pervious substrates as well, but removal from such a substrate may prove problematic or impossible without causing substrate surface damage. For example, when applied to STYROFOAM®, it removes a thin layer of the STYROFOAM® with it, thereby damaging the STYROFOAM® and substantially preventing a subsequent application to any substrate.

Advantageously, the compound is tough yet flexible and therefore peels off as a whole without clinging to the substrate and without breaking apart. Its durability enables it to be applied and removed numerous times. Moreover, the adhesive qualities of the novel material are such that it adheres well to the surface each time it is used.

The novel strippable protective coating compound is a blended two part mix. The first part (Part A) is an over-the-counter general purpose brush caulk product of the type used on houses, buildings, and other structures for maintenance, surface preparation, new construction applications, and the like. More particularly, Part A is preferably a caulking compound of the type including an elastomeric terpolymer or an acrylic copolymer.

Part B of the novel strippable protective coating compound is an over the counter general purpose paint product of the type used in arts and crafts for unlimited decorative applications. More particularly, Part B is preferably a dimensional fabric paint (sometimes called a 3-D paint).

Generally speaking, the caulking compound provides the needed tackiness and the dimensional fabric paint provides the needed viscosity.

The caulking compound and dimensional fabric paint are preferably admixed in a 1:1 ratio by volume until fully blended. The mixture is applied to a surface to be protected, sealed, or decorated and allowed to cure.

The 1:1 ratio is not critical and can vary by about twenty per cent (20%). Thus, the ratio could be seventy per cent (70%) caulking compound and thirty per cent (30%) dimensional fabric paint, or seventy per cent (70%) dimensional fabric paint and thirty per cent (30%) caulking compound, or any other combination between those two limits.

In mixtures where the amount of caulking compound exceeds the amount of dimensional fabric paint, the novel material has decreased viscosity, is more difficult to apply, but dries quickly. When the amount of dimensional fabric paint exceeds the amount of caulking compound, the novel material has greater viscosity, is easy to apply, but takes longer to dry.

Advantageously, even though the novel material may be slower to dry when increased amounts of dimensional fabric paint are used, the surface of the material dries very quickly to the touch, thereby enabling a build-up in thickness of the material as desired.

In other words, viscosity and therefore ease of application increases with increasing amounts of fabric dimensional paint, but drying time increases. Viscosity and ease of application decrease with increasing amounts of caulking compound, but drying time decreases.

The caulking compound accelerates the cure of the novel admixture and the dimensional fabric paint inhibits the tackiness thereof. Thus, the two ingredients complement one another. Caulking compounds contain accelerants so that they surface cure within about thirty to sixty minutes, thereby making it possible to apply a coat of paint thereto. However, the tackiness of caulking compound prevents its use as a strippable protectant, sealant and decorative material. Dimensional fabric paint, on the other hand, inhibits such tackiness. Thus, the mixture of the caulking compound containing an accelerant and the dimensional fabric paint that inhibits tackiness produces the novel material which is ideal for use as a flexible, strippable coating compound that protects, seals, and decorates surfaces.

Dimensional fabric paint is believed to be a type of acrylic paint. Acrylic paint is made by suspending or dispersing pigment in an acrylic resin. Acrylic resin is made by the polymerization of acrylic and methacrylic acid. Acrylic paints are water-based and require no dangerous solvents. They dry quickly if applied in a thin layer and more slowly if applied in a thick layer. The outer surface of a thickly applied quantity of acrylic paint will dry quickly to the touch.

Acrylic paint when diluted with water can be applied in thin layers, like a watercolor. If not diluted, it can be applied in thick layers, like an oil paint. Significantly, it can be diluted as desired to produce a paint of any desired viscosity.

Due to its fast-drying ability, multiple layers of acrylic paints may be painted atop one another to create various artistic effects not possible with other types of paint. Acrylic paint is therefore sometimes referred to as "dimensional paint" because it is so easily built up into three dimensions. It also applies well to fabric and it is believed that because of such application it is sometimes referred to as "dimensional fabric paint." It exhibits flexibility as well and does not easily crack. It therefore is in widespread use in movie costume designs. However, the dimensional fabric paint of this invention is not used in any of these well-known ways. It was heretofore unknown that dimensional fabric paint could be blended with caulking compound to create a strippable protective coating compound as disclosed herein.

Fabric paints have high solids content that are partially responsible for their high viscosity. There are two types of fabric paints: 1) dimensionals; and 2) brushables. Dimensionals have a viscosity of 120–125 Krebs units including 50–60% nonvolatiles. Brushables have a viscosity of 95–107 Krebs units including 30–65% nonvolatiles. The fabric paint of this invention is preferably dimensional fabric paint.

When a fabric paint has been applied to a surface and allowed to dry, it forms a very hard, brittle, glossy paint. The paint may be removed with water, but it may not be peeled off when it is dry, except in very small broken pieces.

Caulking compound has low viscosity and is not suitable for use as a paint. It is used as a sealant around windows, bathtubs, and the like. Caulking compound is also difficult to remove from a surface after it has cured.

Accordingly, a combination of dimensional fabric paint and caulking compound produces a heretofore unknown novel material because dimensional fabric paint and caulking compound have not heretofore been combined. The heretofore unknown novel material has a soft latex-like feel when it is fully cured. It has memory so that it returns to its original shape after being stretched and released. It also has a persistent adhesive quality that enables it to repeatedly adhere to almost any surface, such as metal, glass, painted wood, plastic, ceramic, and so on. It is highly flexible yet tough so that it can be peeled off from a surface either immediately after its has cured or long thereafter, such as months later. Significantly, it may be re-applied and will adhere again. Tests have shown that it can be stripped off a surface and re-applied multiple times without breaking or tearing.

Although many different types of caulking compound have some utility when admixed with dimensional fabric paint, it has been found that super adhesive brush caulk performs best. This is an acrylic copolymer or elastomeric terpolymer type product that contains zinc oxide and less than ten percent (10%) ethylene glycol. It contains no lead, mercury, or asbestos and is best used with adequate ventilation. Its infrared spectra contains ester bands with some variation in the C-H stretches.

Interestingly, the infrared spectra of the dimensional fabric paint of this invention also contains ester bands with some variation in the C-H stretches. The carbon content (25.84% for the caulking compound and 29.02% for the dimensional fabric paint), hydrogen content (6.80% for the caulking compound and 9.17% for the dimensional fabric paint), and the nitrogen content (1.08% for the caulking compound and 1.14% for the dimensional fabric paint) also indicate that the formulations of the two components are somewhat similar, even though they have entirely different characteristics when applied to a surface.

Emission data indicates that the brush caulk includes more than trace levels of solids and inorganics, whereas the dimensional fabric paint has little or no inorganic filler.

Brush caulk containing acrylic copolymers or elastomeric terpolymers is commercially available from many sources such as Anvil Paints of Largo, Fla., (www.anvilpaints.com) and Scott Paints of Sarasota, Fla. (www.scottpaint.com). It is a chemical compound described as an acrylic latex elastomeric caulk.

Caulk is much like paint. Inexpensive caulks have more powder pigment and fillers and less quality resins than do more expensive caulks. Cheaper caulks have less adhesion, less flexibility and are more porous than higher quality caulks that have more adhesion, flexibility and greater density and smoothness.

Similarly, dimensional fabric paint is also commercially available from several sources such as Duncan Enterprises of Fresno, Calif. (yvww.duncan-enterprises.com), where it is sold under the trademark SCRIBBLES® dimensional fabric paint. Another supplier of dimensional fabric paint is Dick Blick art materials (www.dickblick.com) where it is sold as PLAID® dimensional fabric paint.

As mentioned earlier, a one to one ratio, by volume, of an elastomeric terpolymer caulking compound or an acrylic copolymer caulking compound and a dimensional fabric paint provides the best results. The resulting compound is inexpensive to manufacture because brush caulk and dimensional fabric paint are readily available at reasonable prices from multiple sources. The compound is easy to apply, dries quickly to the touch, is flexible, durable, and resilient so that it can be peeled or stripped off from a surface and re-applied many times, exhibits good tensile strength so that it does not come apart even after multiple removals, and provides the desired protective coating, sealant, and aesthetic properties.

The purpose of the novel compound, to be sold commercially under the trademark Flexi-Guard™, Flexi-Peel™, or EZ-Peel™ multi-purpose PSD coating compound, is to protect painted, coated, or natural finished surfaces from exposure to contaminates, foreign materials, nuisance elements of nature and the environment of the type that cause surface finish damage.

The novel material may be provided in the form of a colored or clear material, gel, fluid, foam, or other engineered materials that flow tacky as applied. The material sets-up and surface cures after application. The finished coating is a durable, resilient, and highly functional layer of soft material that provides surface protection. The expansion of foam inherently enhances the functional barrier of protection.

The novel material provides an immediate surface finish protective coating that is easily removable even though no release agents are present. No tools or special skills are needed to accomplish the removal. Moreover, there is no need to mask the area to be protected as a preparatory step such as must be performed prior to painting a surface. The material is easily peeled off from any area where protection is not required.

The novel material applies quickly and easily to surfaces of any shape. Thus, it has utility in connection with unusual shapes. Its use eliminates the need to pay for costly, custom fit or special order protective covers. There are no holes to drill or patterns to cut. Nor is there a need for storage space for bulky custom fitted or special ordered protective covers.

The original color of an original surface finish or a protected painted surface remains visible when the novel material is made of a clear, transparent mixture. The novel material may also be provided in various colors including common colors and decorative glitter featured colors as desired.

The job is finished when the application has been performed, there being no cleanup steps involved.

A consumer might use the novel product in an automotive context to provide a front end cover, protective side moldings, bumpers and roof guards, door edge guards, rocker panel covers, side mirror covers, custom reflective markers, and the like. A consumer may also use the material as a part of vehicle maintenance by applying it to battery terminals, by using it to seal various leaks, by using it to stop vibration noises, and in other ways that may become apparent as various needs arise. Numerous non-automotive applications are also available, limited only by the user's creativity.

An automobile dealer service department might use the novel material for inventory protection of new and used vehicles. Its parts department may sell it as an over the counter product. The detail center can use the material for decorative or add-on enhancements, sell as an over the counter product, and a body shop may use the material for coating paint spray booths, repair preparation masking, or sell as an over the counter product. Again, the uses are limited only by the imagination of the user.

Automotive manufacturers may use the novel material to provide full or partial, selective protection of vehicles during all phases of preparation or storage and transportation of the vehicles to dealers. For maximum efficiency, manufacturers will employ robotic-driven spray nozzles to apply the novel material. In combination with functional protection, finished coatings could be color-coded to highlight or feature different vehicle models, make a statement of symbolic patriotism (such as employing red, white, and blue colors, for example), promote special or seasonal events and numerous other themes limited only by the creativity of the user.

Large retail chain stores, auto parts stores, or other retail outlets and the like could sell the novel compound as a "car care" product or as a "general multi-purpose" merchandise item.

The novel material has automotive, industrial, marine, household, and numerous other uses. It is easy to store, requires no mixing of chemicals by the consumer, and Part A and Part B of the two part mix are each environmentally friendly.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of protecting, sealing, and decorating a surface, comprising the steps of:

preparing a compound by admixing together a brush caulking compound and a dimensional fabric paint; and applying said compound to a surface;

whereby said surface is protected, sealed, and decorated by said compound.

2. The method of claim 1, wherein the step of preparing said compound includes the step of admixing together an elastomeric terpolymer brush caulking compound and a dimensional fabric paint.

3. The method of claim 1, wherein the step of preparing said compound includes the step of admixing together an acrylic copolymer brush caulking compound and a dimensional fabric paint.

4. The method of claim 1, wherein the step of applying said compound includes the step of applying said compound with a brush having an applicator means formed of bristles.

5. The method of claim 1, wherein the step of applying said compound includes the step of applying said compound with a sponge foam-applicator.

6. The method of claim 1, wherein the step of applying said compound includes the step of applying said compound with a roller.

7. The method of claim 1, wherein the step of applying said compound includes the step of applying said compound with a squeeze bottle.

8. The method of claim 1, wherein the step of applying said compound includes the step of applying said compound with a dispenser can.

9. The method of claim 1, wherein the step of applying said compound includes the step of applying said compound with a cartridge.

10. The method of claim 1, wherein the step of applying said compound includes the step of applying said compound with a texture finish sprayer.

11. The method of claim 1, further comprising the steps of:

removing the compound from said surface after the compound has cured; and performing said removal step by stripping the compound from said surface;

said compound having a tensile strength sufficient to ensure that said compound is stripped from said surface as an integral whole.

12. The method of claim 11, further comprising the steps of repeatedly reapplying the compound in its cured, integral whole state to said surface and repeatedly removing said compound from said surface, said compound having sufficient adhesiveness to enable it to be adhered to said surface even after repeated strippings and reapplications to said surface.

* * * * *